Inventors:
Herbert M. Strong,
Francis P. Bundy,
by Richard E. Haley
Their Attorney.

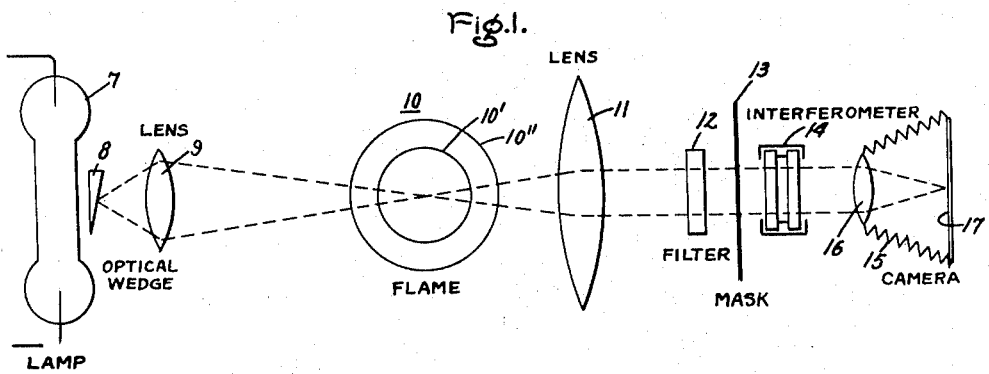
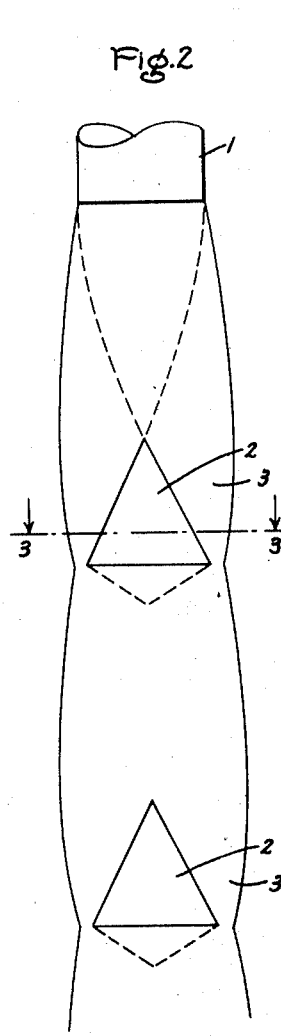
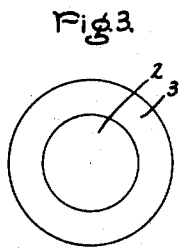
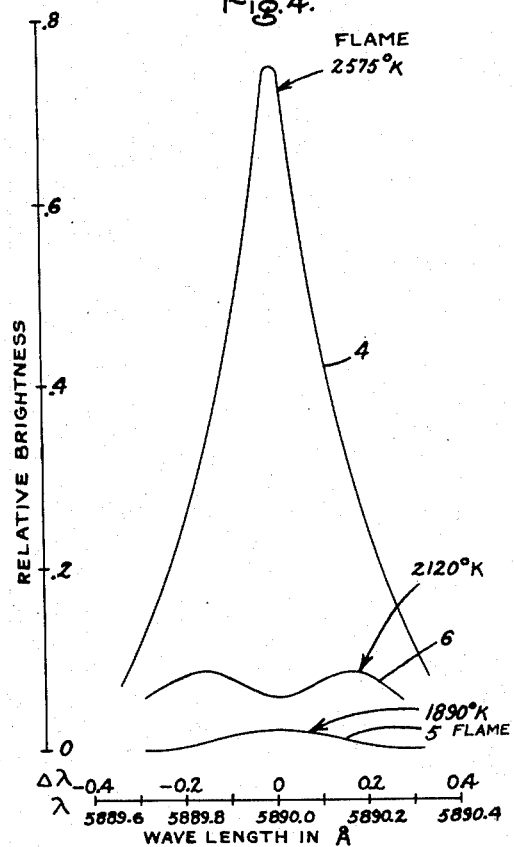

Feb. 3, 1953  H. M. STRONG ET AL  2,627,202
APPARATUS FOR MEASURING FLAME TEMPERATURES
Filed May 18, 1949  6 Sheets-Sheet 3
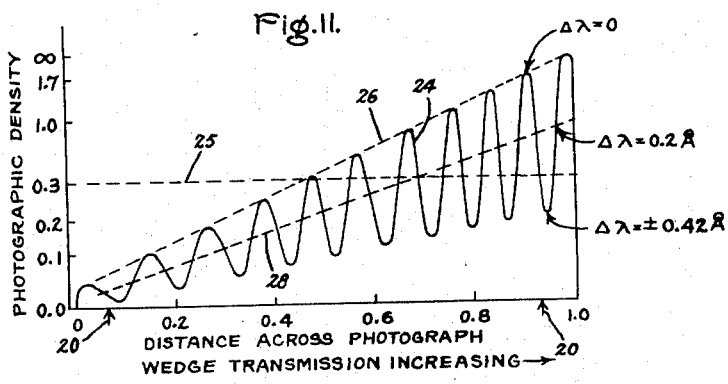
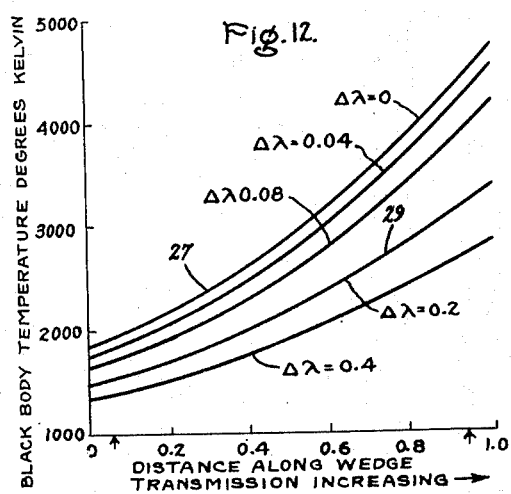
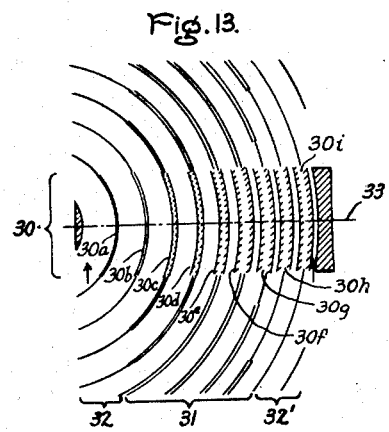
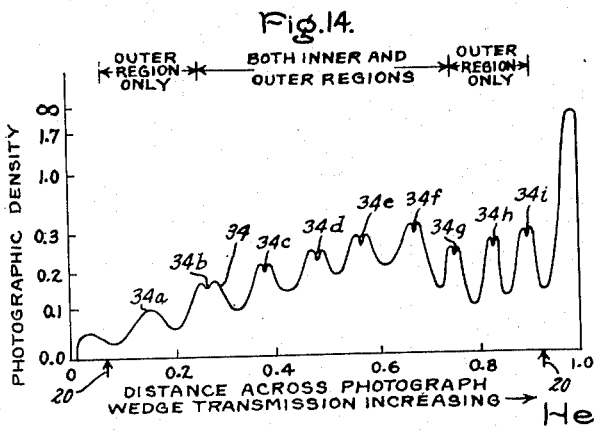
Inventors:
Herbert M. Strong,
Francis P. Bundy,
by Richard E. Hosley
Their Attorney.

Inventors:
Herbert M. Strong,
Francis P. Bundy,
by Richard E. Hosley
Their Attorney.

Feb. 3, 1953     H. M. STRONG ET AL     2,627,202
APPARATUS FOR MEASURING FLAME TEMPERATURES
Filed May 18, 1949     6 Sheets-Sheet 6
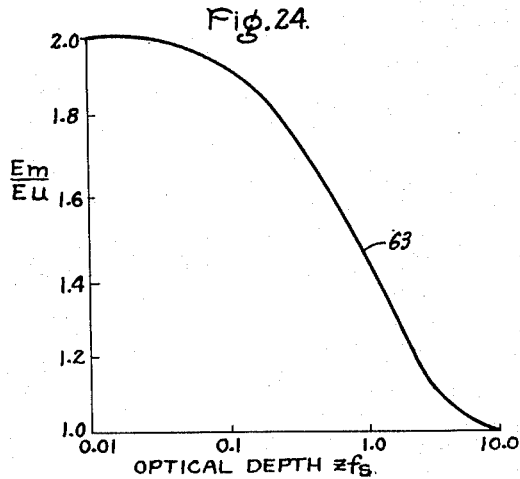
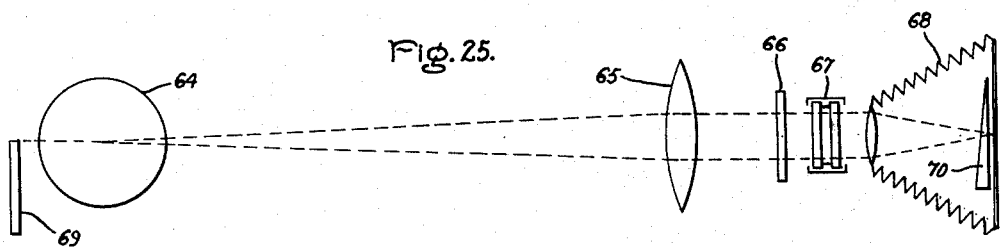
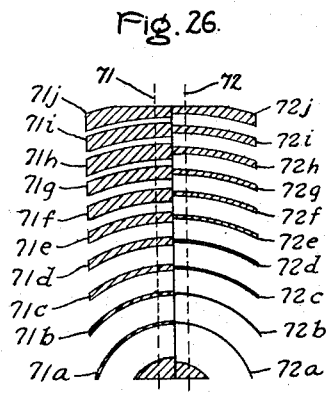
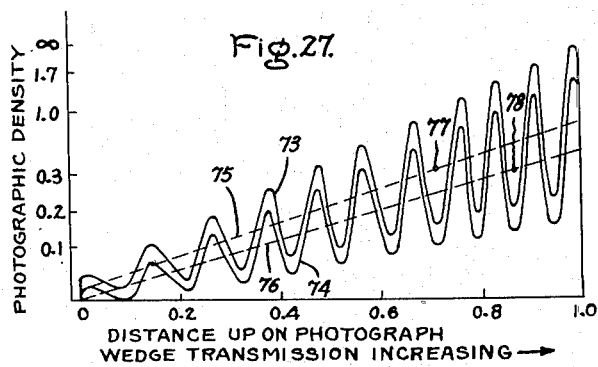
Inventor:
Herbert M. Strong,
Francis P. Bundy,
by Richard E. Hosley
Their Attorney.

Patented Feb. 3, 1953

2,627,202

UNITED STATES PATENT OFFICE 2,627,202

APPARATUS FOR MEASURING FLAME TEMPERATURES

Herbert M. Strong, Schenectady, and Francis P. Bundy, Alplaus, N. Y., assignors to General Electric Company, a corporation of New York Application May 18, 1949, Serial No. 93,884

7 Claims. (Cl. 88—22.5)

This invention relates to pyrometry, and in particular to optical apparatus for measuring temperatures within complex flames.

An object of the invention is to provide means for accurately measuring the temperature of hot, luminous gas surrounded by cooler gas, or vice versa, and in particular to provide means for the measurement of flame temperatures in rocket motors, ram jets, and the like.

Another object is to provide means for accurately measuring extremely high temperatures of gases.

Another object is to provide temperature-measuring means for surveying the entire cross-section of a flame in one observation.

Other objects and advantages will become apparent as the description proceeds.

Figure 5:
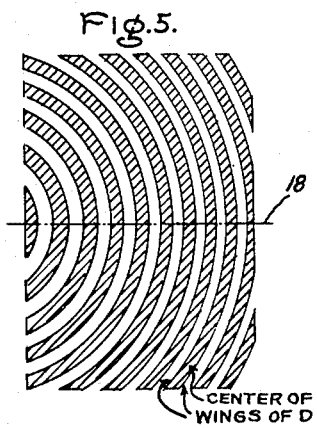
Figure 6:
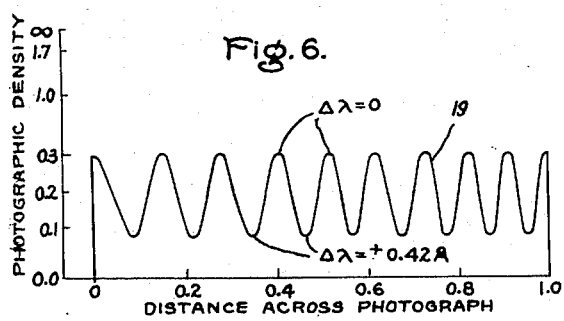
Figure 7:
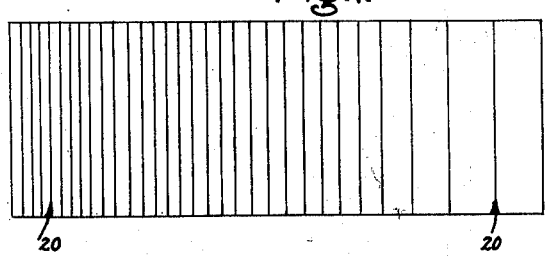
Figure 8:
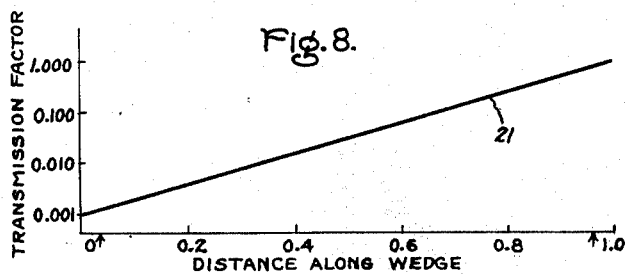
Figure 9:
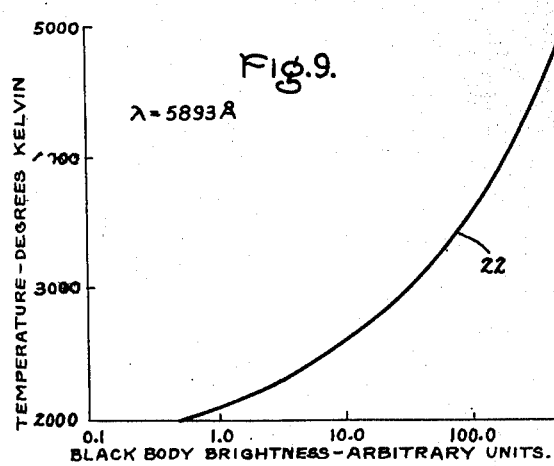
Figure 10:
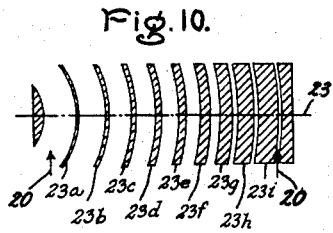
Figure 15:
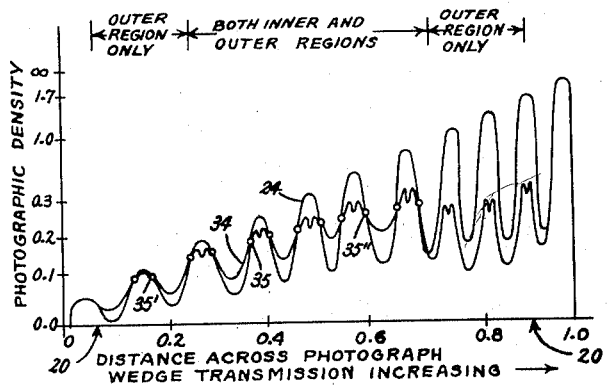
Figure 16:
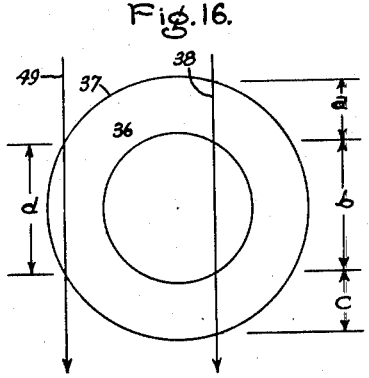
Figure 17:
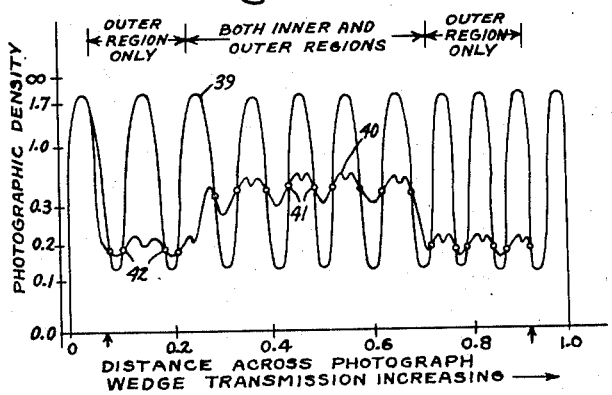
Figure 18:
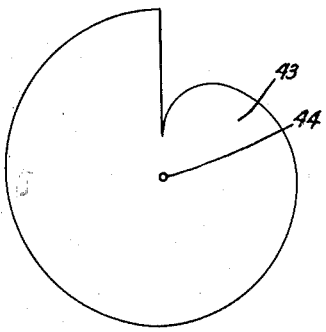
Figure 19:
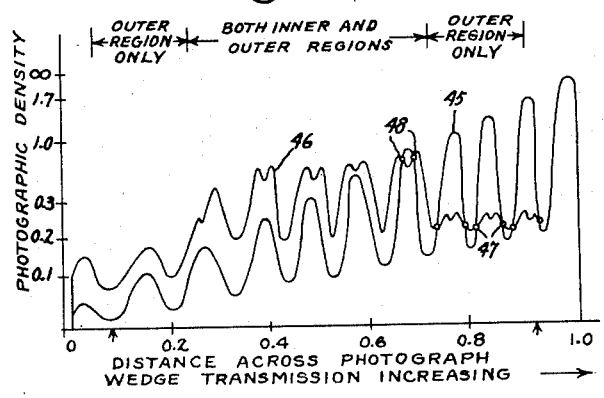
Figure 20:
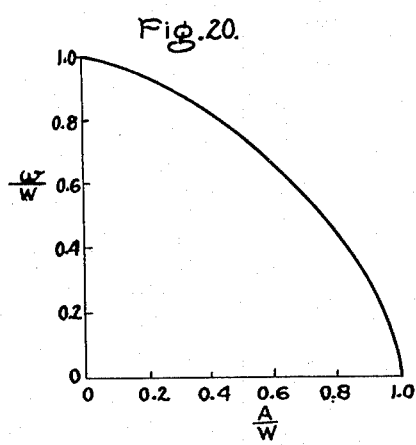
Figure 21:
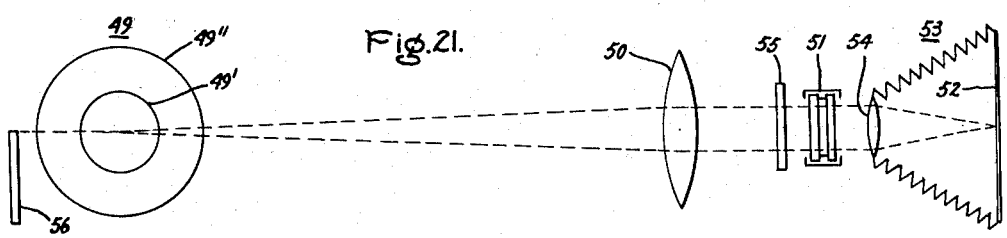
Figure 22:
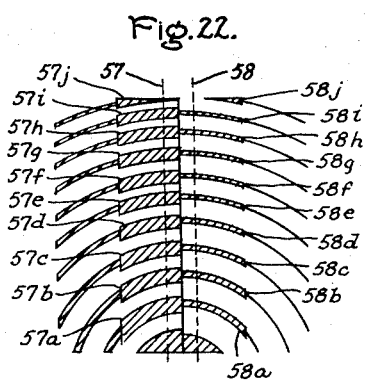
Figure 23:
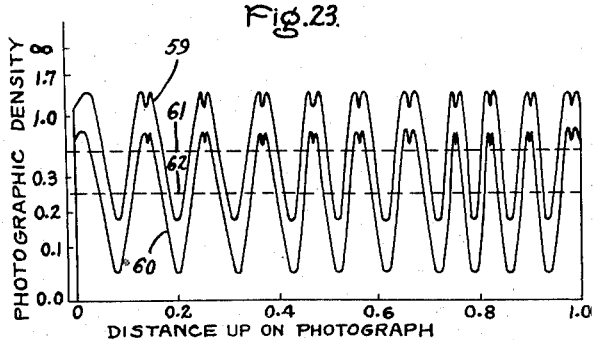

For a better understanding of the invention, reference is made in the following description to the accompanying drawings in which Fig. 1 is a schematic diagram of apparatus embodying principles of this invention; Fig. 2 is a schematic representation of the complex flame structure of a rocket motor; Fig. 3 is a section of the flame along the line 3—3, Fig. 2; Fig. 4 is a graph of brightness versus wavelength used in explaining the invention; Fig. 5 represents a photograph of an interference pattern which is more fully explained hereinafter; Fig. 6 represents a densitometer trace taken across the photograph shown in Fig. 5; Fig. 7 is a schematic representation of an optical wedge used in apparatus of Fig. 1; Fig. 8 is a graph of transmission factors for a typical optical wedge; Fig. 9 is a graph of temperature versus black-body brightness at a wavelength of 5893 Å.; Fig. 10 represents a photograph of another interference pattern; Fig. 11 represents a densitometer trace taken across the photograph shown in Fig. 10; Fig. 12 is a typical calibration chart for a particular light source and optical wedge combination; Fig. 13 represents a photograph of another interference pattern; Fig. 14 represents a densitometer trace taken across the photograph shown in Fig. 13; Fig. 15 is a graph made by combining Figs. 11 and 14; Fig. 16 is a representation of paths followed by certain light rays in passing through the flame; Fig. 17 represents another set of densitometer traces; Fig. 18 shows a rotating sector wheel type of optical wedge; Fig. 19 represents another set of densitometer traces; Fig. 20 is a graph of correction factors hereinafter explained; Fig. 21 is a schematic diagram of other apparatus embodying principles of this invention; Fig. 22 represents a photograph of another interference pattern; Fig. 23 represents densitometer traces taken across the photograph shown in Fig. 22; Fig. 24 is a graph used to determine optical depth, as hereinafter explained; Fig. 25 is a schematic diagram of other apparatus embodying principles of this invention; Fig. 26 represents a photograph of another interference pattern; and Fig. 27 represents densitometer traces taken across the photograph shown in Fig. 26.

The drawings include a number of graphs which are useful in practicing the invention. These graphs are drawn to a small scale with sufficient accuracy to illustrate the principles of the invention. For use in making actual computations, it will be found desirable to prepare some of the graphs on a large scale not suitable for patent drawings. The manner of preparing such graphs will be apparent to those skilled in the art from the following description of the invention, which includes appropriate equations and illustrative examples.

Before considering the apparatus shown in Fig. 1, some theory will be discussed which will aid in understanding the invention. Refer now to Figs. 2 and 3, which illustrate the complex flame structure of a rocket motor. The tailpipe of the motor is represented at 1. The flame structure is characterized by the presence of a series of shock diamonds 2, within which gas comprised in the flame is at extremely high temperature. Surrounding the shock diamonds are areas 3 of somewhat cooler gas.

In studying such flame structures to improve the design and operation of rocket and jet motors, it becomes necessary to determine the temperatures existing in hot, inner portions of the flame, such as the shock diamonds. Accurate measurement of these temperatures is difficult; and heretofore it has not been possible to obtain measurements in which workers skilled in the art could place confidence. The introduction of a thermocouple or other heat measuring element into the flame itself is not practicable, not only because of the high temperature of the flame, but because the gas in the flame travels at very high velocities; in fact, at supersonic speeds. If any measuring instrument is introduced into the flame, a pressure wave forms in front of the instrument which causes a rise in temperature above the already high temperature of the gas. A thermocouple wire, for example, is almost immediately destroyed under such conditions. Similar problems exist in studies of other high-temperature flames.

Previously, optical pyrometers have been used in an attempt to measure these temperatures, usually by the sodium-line reversal method. In this prior-art method, a large incandescent lamp produces a beam of bright light of continuous spectrum. This beam is directed through the flame at a place where temperature is to be measured. After passage through the flame, the beam is dispersed by a prism to form a spectrum. Since the gas in a flame normally contains a small amount of sodium vapor, the sodium or D lines are prominent in this spectrum. If a sufficient quantity of sodium vapor is not naturally present, a very small amount of a sodium salt, such as sodium chloride, may be added to the fuel, or supplied to the high-temperature region in any other convenient manner.

If the flame is hotter than the light source, the D lines appear as bright "emission" lines in the spectrum. If the light source is hotter than the flame, the D lines appear as dark "absorption" lines. By varying the electric current supplied to the lamp and noting, from previous calibration of the lamp, the equivalent temperature of the light source at which the D lines match the continuous spectrum in brightness, the flame temperature is determined. Other resonance-type spectral lines exhibit the same phenomenon. The D lines of the sodium spectrum are the ones usually used, among other reasons because they are naturally prominent in most flame spectra and are most visible.

The method just described is very accurate if all parts of the flame are at the same temperature. However, when this method is used with a complex flame structure, such as that illustrated in Figs. 2 and 3, the relatively cool gas surrounding the hotter gas in the inner part of the flame absorbs part of the light emitted by the hotter gas, since both gases usually contain some sodium vapor. This causes the temperature indicated by the sodium-line reversal method as previously used to be intermediate in value between the temperature of the hotter gas and the temperature of the cooler surrounding gas. In measuring temperature within the shock diamond of a rocket motor flame, the indicated temperature may be lower than the true temperature by 100° to 500° Kelvin.

Another limitation of the conventional sodium-line reversal method is that no temperature can be measured which is higher than the maximum equivalent temperature of the incandescent lamp used. This has restricted its use to temperatures below about 3800° K., and has prevented its use to measure extremely high temperature flames such as carbon arcs. Accurate means to measure higher temperatures has been much needed.

Still another limitation is that each observation supplies only one temperature reading. A survey of a flame area thus necessitates a number of observations, which may require more time than is available, and in any event adds to the labor and difficulties involved.

Referring now to Fig. 4, curve 4 shows the contour or relative brightness versus wavelength for a typical sodium or D spectral line centered at a wavelength of 5890 angstrom units. When an instrument of sufficient resolving power is used, it is discovered that this line, like other resonance lines of a spectrum, has an appreciable width, which may, for example, be about 0.3 Å. at the half-brightness value. The width of the line can be increased by increasing the optical depth of the luminous gas used to produce the line, which may be done by increasing the sodium content, the pressure, or the thickness of the gas. On the scale at the bottom of Fig. 4 the $\lambda$ units designate wavelength in Å., while the $\Delta\lambda$ units designate deviation in Å. from the central wavelength of 5890 Å.

Curve 4 represents the brightness contour for a gas containing sodium vapor at a temperature of 2575° K. Curve 5 represents the much less intense brightness of gas at a temperature of 1890° K. In a complex flame of the type described, light emitted by the hotter gas, at 2575° K. for example, must pass through a layer of the cooler gas, at 1890° K. for example, and during such passage a part of the intense illumination from the hotter gas is absorbed by the cooler gas. The emerging light may then have the brightness contour represented by curve 6, intermediate in value between the brightness of the hotter gas and the brightness of the cooler gas. This intermediate brightness may, for example, have an average value equal to that of a gas at 2120° K. This is approximately the temperature which will be indicated by the conventional sodium-line reversal method of temperature measurement.

Similar effects occur in the D line centered at 5896 Å. To simplify the description, only the line centered at 5890 Å. is considered at present.

Considering a D line as itself being a tiny spectrum, it has been found that the absorption is greatest in the center of this spectrum at the wavelength of 5890 Å. If the layer of cool gas is sufficiently thick and contains a sufficient quantity of sodium vapor, in other words, if its optical depth is large, the absorption at the center wavelength may be sufficiently great to bring the center of curve 6 down almost in coincidence with curve 5. However, absorption in the wings of the spectrum is much smaller. Accordingly, in the wings curve 6 remains much closer to curve 4.

Physically this may be explained by the fact that the atoms of cooler gas both absorb and radiate energy. Since the illumination from the hotter gas is greater than the illumination which would be produced by the cooler gas, the cooler gas absorbs more light than it radiates, and the net effect is one of energy absorption. The absorption, however, is effective over a somewhat narrower band of wavelengths than the radiation. Therefore, the cool gas absorbs radiation most strongly at the center wavelength of 5890Å., and radiates energy over a broader band of the spectrum, thus building up the wings of the D-line spectrum at the expense of the center.

The curves of Fig. 4 may be described mathematically in the following manner: The brightness E of a thermally excited resonance spectral line, such as a D line emitted by a hot, luminous gas containing sodium vapor, is given by the equation:

(1) $$E = E_{bb} f_{bb}$$

in which $E_{bb}$ is the brightness of a black body at the same temperature, and is given by the well-known relation (2) $$E_{bb} = \frac{C_1 e^{-\frac{C_2}{\lambda T}}}{\pi \lambda^5}$$

where $C_1$ and $C_2$ are physical radiation constants equal to $3.732 \times 10^{-5}$ erg. cm.$^{2}$/sec. and 1.436 cm.—°K., respectively, $\lambda$ is the wavelength of the light in cm., $e$ is the base of natural logarithms, and $T$ is the temperature in degrees Kelvin. $f_{bb}$ is the "black-body factor" for the particular body of gas, and is related to the transmission factor $t$ by the equation (3) $$f_{bb} = 1 - t$$

The transmission factor $t$ is related to the optical depth $z$ of the body of gas at the center wavelength of the spectral line and to a shape factor $f_s$ by (4) $$t = e^{-zf_s}$$

The optical depth $z$ at the center wavelength is proportional to the probability of absorption of light by one sodium atom, and number of sodium atoms per cubic centimeter of the gas, and the length of the light path through the gas. The shape factor $f_s$ is a function of wavelength, and largely determines the shape of the sodium line brightness contour. For flames at atmospheric pressure, it is given by the equation (5) $$f_s = \frac{W_0^2}{W_0^2 + (\Delta\lambda)^2}$$

where $W_0$ is the half-width in Å. at the half-brightness value of the spectral line radiated by a very thin wafer of luminous vapor, and $\Delta\lambda$ is the deviation in Å. from the wavelength at the center of the contour—for example from 5890.0 Å. for one of the D line lines. At any given value of $\Delta\lambda$, the optical depth is the product of $z$ and the $f_s$ value for that $\Delta\lambda$. The D lines have $W_0$ values of approximately 0.049 Å.

When the proper respective values of T and $z$ are inserted in these equations, Equation 1 describes curves 4 and 5, Fig. 4.

When light emitted by a hot gas at temperature $T_1$ passes through a cooler gas at temperature $T_2$, the brightness $E_{1,2}$ of the emerging light is equal to the product of the brightness $E_1$ of the light emitted by the hotter gas and the transmission factor $t_2$ of the cooler gas, plus the brightness $E_2$ of light emitted by the cooler gas, or (6) $$E_{1,2} = E_1 t_2 + E_2$$

Equation 6 describes the shape of curve 6, Fig. 4.

It should now be evident that a more accurate indication of the temperature of the hotter gas in a complex flame can be obtained from the brightness in the wings only of the D-line spectrum, than is obtained from the average brightness of the whole line as was attempted in the sodium-line reversal method previously employed. Moreover, by a simple calculation hereinafter described, temperature measured from brightness in the wings of a spectral line can be converted to the true temperature of the hotter gas.

Similar considerations apply when an attempt is made to measure the temperature of a relatively cool gas surrounded by hotter gas. The methods herein described are applicable in either case.

One requirement for apparatus to measure temperature in this manner is a greater resolving power than is provided by the spectroscopic element of optical pyrometers previously used. A resolving power of $$\frac{\lambda}{\Delta\lambda} = 100{,}000$$

or better is desirable. Although this degree of resolution may be obtained with a 21-foot grating spectrograph or a Lummer-Gehrcke plate, for example, the invention is best carried out with apparatus including a Fabry-Perot interferometer, as hereinafter described.

Refer now to Fig. 1, which shows apparatus adapted to measure temperature from brightness in the wings of a spectral line. Light source 7 may be a sodium-vapor electric lamp, adapted to produce intense illumination at wavelengths comprised in the D lines of the spectrum. Alternatively, light source 7 may be a high temperature flame—for example, an oxy-acetylene flame—which has a constant, uniform temperature and contains sodium vapor, or it may be any other source of light of intense and constant brightness at the desired wavelengths. It is an advantage of this invention that the light source used need not provide a continuous spectrum, such as is required in the conventional sodium-line reversal method. Because of this advantage, light sources having very high equivalent black body temperatures can be used. For example, a sodium vapor lamp may have a brightness at the center wavelength of a sodium spectral line equivalent to a temperature as high as 6000° K.

Light source 7 illuminates an optical wedge 8. Wedge 8 varies in opacity along its length in some known manner, and thus provides light of graduated brightness. This graduated brightness corresponds to a range of known temperatures, as is hereinafter explained. An additional lens, not shown, may be provided between the light source and the wedge if desired, to focus the light and illuminate the wedge more strongly. This makes possible the use of a shorter exposure time when the images are photographed as hereinafter described. If needed, a mask, not shown, may be provided to block all light from source 7 except that which illuminates wedge 8.

A lens 9, or equivalent optical system, forms an image of wedge 8 within the region of the flame 10 where temperature is to be measured. The flame is represented by a cross section in which the inner circle 10' bounds an extremely hot inner region, while the outer circle 10'' bounds a cooler outer region. This particular flame will be assumed to have the same cross section throughout its length, but it will be apparent that the invention is not limited to this case.

In Fig. 1, a typical pair of light rays is represented by the broken lines on the drawing. These lines cross at the focal plane within the flame where an image of the optical wedge is formed. After passing through the flame, the light rays from the optical wedge proceed through a collimating lens 11, from which all rays from the same portion of the wedge image emerge substantially parallel. Lens 11 should be large enough to collect all the rays from the wedge image in the flame. Otherwise the system may have a bias in favor of the flame, which could cause incorrect temperature indications.

Preferably, the light rays next pass through a filter 12, which attenuates light of undesired wavelengths and thus makes it easier to observe the D-line interference patterns hereinafter described. A typical filter used passes a band of wavelengths about 100 Å. wide centered at 5893 Å. The filter is transparent to the two D lines, centered at 5890 Å. and 5896 Å., respectively, but is opaque to light of greatly different wavelengths. The filter may be smaller than lens 11, since it does not matter if some of the light rays are lost after the rays are collimated, because light from the flame and light from the wedge image are equally affected by such loss and no bias is introduced into the system thereby. If desired, a mask 13 may be placed either before or behind the filter to limit the area from which light rays are admitted to the remainder of the optical system.

Next in the path of the light rays is a spectroscopic element of high resolving power. Preferably this is a Fabry-Perot interferometer 14, which comprises two very flat parallel glass plates spaced a short distance apart. The inside surface of each plate is slightly silvered, so that light is partly transmitted through and partly reflected from the silvered surfaces. Interference results between reflected and unreflected rays, or between rays undergoing different numbers of reflections. This forms an interference pattern of concentric annular fringes as hereinafter described. Additional description of the Fabry-Perot interferometer may be found in "Fundamentals of Physical Optics," chapter 4, by Jenkins and White, published by McGraw-Hill Book Company, Inc., New York city.

The interferometer is a kind of microspectroscope, which greatly magnifies an essentially monochromatic region of the spectrum as represented by a single spectral line. Each fringe is the magnified spectral line, which is repeated again and again in successive fringes. In any one fringe the spectral line is sufficiently well resolved that the brightness may be observed at any desired value of $\Delta \lambda$ from the line center.

The last element is a camera 15. The camera lens 16 forms an iterated image of the optical wedge on the camera plate 17. Since the first image of the wedge is formed within flame 10, an image of the flame is simultaneously formed on the camera plate and overlaps the wedge image. If no interferometer were present, true images would be formed. Due to the presence of interferometer 14, both images on the camera plate are broken up into a pattern of interference fringes, and the images are outlined in the interference pattern, as hereinafter described. It will be understood that the camera plate could also be a film or sensitized paper, and it is intended that the terms "camera plate" and "photographic plate" as used herein should include such equivalents.

Refer now to Fig. 5, which is a schematic representation of a simple interference pattern formed by a Fabry-Perot interferometer. Such a pattern may be formed on camera plate 17, Fig. 1, with light source 7 turned off and with a flame at 10 of uniform temperature, having no cooler gas surrounding the hot gas at the center of the flame. The flame contains a small amount of sodium vapor, preferably about ¼ to 5 parts per million, which may be present due to natural contamination of the fuel, or may be added if necessary. The interference pattern results from D lines in the spectrum of light emitted by the hot gas. The shaded areas in Fig. 5 represent illuminated portions of the pattern, or the dark portions of a photographic negative. An image of the flame is outlined by the boundaries of the interference pattern. If the flame image were sufficiently large and if it were centered relative to the interferometer axis, the shaded areas representing bright interference fringes would be complete concentric rings. Usually the flame image covers only a portion of a complete interference pattern, as shown.

Each of the shaded rings or interference fringes represents the tiny spectrum of a D line, which is repeated in the other rings. The wings of this spectrum are at the inner and outer edges of each ring, and the center is at the center of the annular width of each ring, as indicated in Fig. 5. An actual interference pattern may have a larger number of fringes than is illustrated in the drawings.

Fig. 5 is schematic only, since an actual photograph reveals by its shading the relatively low brightness in the wings of the D-line spectrum and the much greater brightness at the spectrum center. Quantitative measurements of these differences can be made by taking densitometer tracings across the photographic plate, for example along broken line 18, or across any single annular width of a ring. A densitometer trace across a single ring would have approximately the shape of curve 4, Fig. 4, with density of the photographic negative represented by the ordinates and distance along the line of the trace represented by the abcissae. In actual practice, photographic density is not exactly proportional to brightness, because photographic film does not have a perfectly linear characteristic for all brightness values. However, in practicing this invention, the nonlinearity is taken care of in the calibration, and causes no trouble.

Referring now to Fig. 6, curve 19 represents a typical densitometer trace taken along a path corresponding to line 18, Fig. 5. The peaks of curve 19 represent points of maximum film density, or maximum brightness of the interference fringes represented by shaded areas in Fig. 5. The troughs of curve 19 represent points of minimum film density, found in the areas between fringes of the interference pattern. Each cycle of curve 19 is similar in shape to curve 4, Fig. 4, and approximately represents the brightness versus wavelength contour of the D-line spectrum.

At each peak of curve 19, $\Delta\lambda=0$. The value of $\Delta\lambda$ at the bottom of each trough of curve 19 is determined by the spacing of the interferometer plates, according to the equation (7) $$\Delta\lambda_{\text{trough}} \simeq \pm \frac{\lambda^2}{4s}$$

where $s$ represents the distance in Å. between interferometer plates. For a particular spacing, $\Delta\lambda_{\text{trough}}$ may have a value of $\pm 0.42$ Å. as shown in Fig. 6.

Apparatus for making densitometer traces commonly includes means for recording the density curve on a scale much larger than the photograph from which the trace is made, so that a large, easily-read curve is obtained from a photograph which may be quite small. The limiting factor which determines the maximum extent to which such enlargement is desirable is the grain size of the photographic emulsion. An actual densitometer tracing may be much larger than Fig. 6.

It will be remembered that there are two D lines in the sodium spectrum; therefore, there are two sets of rings in the interference pattern, one for each line. However, if the spacing between the interferometer plates is very slightly varied, it can be observed that the two sets of rings move radially by different amounts; and it is possible, by adjusting the spacing between the plates, to bring the two patterns into substantial coincidence, at least in the central portions of the pattern which will be used, so that they appear as a single pattern of concentric rings. A high degree of coincidence is obtainable with patterns of the two D lines because their wavelength difference is small. Spectral lines which are more widely separated in wavelength cannot be made to coincide so well. After the two patterns have been brought into coincidence, no further complications arise from the fact that two spectral lines are involved rather than one, since the same effects occur in each line.

Refer now to Fig. 7, which is a schematic representation of an optical wedge, such as the wedge 8 in Fig. 1. Relative opacity is represented by the shading; that is, density of shaded lines in Fig. 7 is proportional to opaqueness of the wedge. At its right-hand side the wedge is very transparent, while at its left-hand side is relatively opaque. The degree of opacity varies from right to left according to some predetermined relation. Usually the variation in opacity is linear, as illustrated in Fig. 7, which makes the transmission characteristic of the wedge logarithmic. Marks or indices 20, shown along the bottom edge of the wedge, may be provided for calibration purposes. These indices may be either wholly transparent or wholly opaque lines or arrows on the wedge, and may extend all the way across the wedge. The optical wedge may be a physically wedge-shaped piece of colored glass or dye, it may be a bit of photographic film which has been exposed and developed to have a graduated optical density along its length, or it may be a rotating sector wheel or other apparatus to produce an equivalent result.

Curve 21, Fig. 8, represents the transmission characteristic of a typical wedge. This figure is a graph which shows the transmission factor of the wedge at each point along its length. For example, assume that light from a source having a brightness value of 100 units is transmitted through the wedge. At the transparent right-hand side of the wedge, the transmitted light has a value equal to the product of the source brightness, 100 units, and a transmission factor of very nearly 1.000, or $1.000 \times 100 = 100$ units. At a distance of 0.4 of the wedge length from the more opaque left-hand end, the transmitted light has a brightness of $0.010 \times 100$, or 1 unit. Thus when the brightness of light transmitted through any part of the wedge is known, the brightness of light transmitted through any other part can be determined with the aid of a curve similar to curve 21, Fig. 8, constructed for the particular wedge used. Data for a particular wedge from which a curve similar to curve 21 may be plotted can be obtained from a knowledge of the construction of the wedge, or from conventional measurements of wedge opacity at various points, as will be evident to those skilled in the art.

A known brightness of light at a given wavelength corresponds to a determinable equivalent temperature of a black body having equal brightness at the same wavelength. This is evident from equation (2) $$E_{bb} = \frac{C_1 e}{\pi \lambda^5} - \frac{C_2}{\lambda T}$$

Curve 22, Fig. 9, shows the relation between black-body brightness $E_{bb}$ and temperature $T$ for wavelength $\lambda = 5893$ Å. This wavelength is the average wavelength for the two D lines of the sodium spectrum, and for present purposes may be used to represent either line without appreciable error. Arbitrary brightness units are shown which are more convenient in magnitude than the values in ergs given by Equation 2.

With the aid of Fig. 9, or a similar graph prepared from Equation 2, a given brightness can be quickly converted to an equivalent black-body temperature, or vice versa. Thus a calibrated light source and optical wedge which provides a known range of brightness values as hereinbefore explained, also provides a determinable range of equivalent black-body temperatures. For example, using the arbitrary brightness units employed in Fig. 9, brightness values of 1 unit and 100 units correspond approximately to temperatures of 2100° K. and 3650° K., respectively.

In the apparatus of Fig. 1, when light source 7 is turned on but no flame is present in the optical path, an image of the illuminated optical wedge is formed on camera plate 17. This image is graduated in brightness in a manner dependent on the graduation in opacity of the wedge, and is broken up into a pattern of interference fringes because the light rays pass through the interferometer before they reach the camera plate. The resulting interference pattern, bounded by the outline of the wedge image, is schematically represented by Fig. 10.

The brightest part of the image, corresponding to the most transparent part of the wedge, is at the right-hand side of Fig. 10, as is evidenced by the prominence of the interference fringes at that side of the figure. The least bright part of the image, corresponding to the most opaque part of the wedge, is at the left-hand side of Fig. 10 as is evidenced by the faintness of the interference fringes on that side. Note that the wedge index marks 20 are visible at the bottom of the wedge image.

Refer now to Fig. 11, in which curve 24 illustrates a densitometer trace taken along broken line 23, Fig. 10. The peaks of curve 24 occur where $\Delta\lambda = 0$, and the troughs occur where $\Delta\lambda = \pm 0.42$ Å., the same as in Fig. 6. In Fig. 11, note that at the right-hand side, which corresponds to the more transparent end of the optical wedge, both the peaks and the troughs of curve 24 are higher than they are at the left-hand side of the figure, which corresponds to the more opaque part of the wedge. It is evident that the transmission characteristic of the wedge $\Delta\lambda$ both affect the brightness of the interference pattern at any particular point.

Suppose that wedge 8, Fig. 1, has the transmission characteristic represented by Fig. 8, but that the brightness of lamp 7 is unknown. It is desired to calibrate the wedge and lamp combination to determine the equivalent temperatures represented by the respective brightness values of light transmitted through the wedge. This may be done as follows: A light source of known brightness is used as a standard of comparison. This source may be a uniform flame of known temperature: for example, a uniform flame having a temperature of 2500° K., which can be accurately measured using the conventional sodium-line reversal method. Sufficient sodium vapor is supplied to this flame to bring the brightness of the D spectral lines at center wavelength $\Delta\lambda = 0$ up substantially to maximum or black-body brightness. The brightness at the center wavelength of each D-line emitted by this flame is then known to be equivalent to that of a black body at a temperature of 2500° K. Instead of a standard flame, it is possible to use any other standard light source which emits light having D lines of known brightness at their center wavelengths.

This standard flame is placed in the optical system shown in Fig. 1, less flame 10, positioned so that an image of the standard flame, modified by the interference pattern produced by interferometer 14, is formed on camera plate 17. For example, the standard flame may be placed in or near the position in which flame 10 is shown in Fig. 1. The pattern on the camera plate due to the standard flame is similar to the one represented by Fig. 5. This pattern is photographed, and a densitometer trace is made along a path corresponding to line 18, Fig. 5. This trace may, for example, be represented by Fig. 6.

The image formed by the illuminated wedge, represented by Fig. 10, is also photographed, using identical or equivalent exposure times, photographic plates, and development processes, so that equal film densities on the two photographs represent equal values of brightness. To insure that the camera plates, exposure times, and development processes are identical, both photographs may be made simultaneously on the same plate or film, by adjusting the positions of the flame and the wedge so that their respective images are formed on different parts of the camera plate.

A densitometer trace, represented by Fig. 11, is made along a path corresponding to line 23, Fig. 10, which passes through the patterns 23a to 23i. Wedge index marks 20 are indicated on Fig. 11 at their respective distances from the ends of the wedge, for purposes to be explained hereinafter.

In Fig. 6, the peaks of the densitometer trace, curve 19, show a photographic density of about 0.3. Therefore, this density corresponds to a black-body temperature of 2500° K., since this temperature is known to be the black-body equivalent of the flame brightness at $\Delta\lambda=0$. Referring now to Fig. 11, line 25 is drawn horizontally across the figure at the same photographic density 0.3. Line 26 is drawn through the peaks of curve 19, the $\Delta\lambda=0$ values. Curve 26 crosses curve 25 at a point about 0.43 of the wedge length from its more opaque end. At this point the wedge transmits light from the source, of wavelength $\Delta\lambda=0$, with a brightness equivalent to a temperature of 2500° K. In the arbitrary brightness units used in Fig. 9, this brightness has a value of 7.2 units.

Reference to Fig. 8 shows that at the point on the wedge corresponding to this brightness of transmitted light, 0.43 of the wedge length from the more opaque end, the light transmitted through the wedge is 0.016 as bright as the light source. Therefore, the brightness of the light source at $\Delta\lambda=0$ is $$\frac{7.2}{0.016}$$

or 450 units. Reference to Fig. 9 shows that this brightness is equivalent to that of a black body at approximately 4800° K. Thus the brightness of the light source is determined from a standard of much lower brightness and temperature.

By this method, the brightness of light sources having exceedingly high equivalent black-body temperatures can be accurately determined. Also, the temperature of a uniform flame may be determined in this manner. A method for measuring temperatures in complex flames is described hereinafter. It has been found that a good quality of sodium vapor lamp with a regulated voltage supply maintains a sufficiently constant brightness that frequent recalibration is not necessary.

Once the brightness of the light source at $\Delta\lambda=0$ is known, then the brightness of light at $\Delta\lambda=0$ transmitted through any part of the optical wedge can be determined with the aid of the transmission curve for the wedge, Fig. 8. For example, Fig. 8 shows that at a distance 0.6 of the wedge length from its more opaque end, the light transmitted is approximately 0.04 as bright as the light source. If the brightness of the source is 450 units, as computed above, then the brightness of light transmitted through the wedge at the point considered is $450 \times 0.04 = 18$ units. From Fig. 9, the equivalent black-body temperature for each of these brightness values can be determined. Equivalent temperatures for a number of points along the wedge may be computed in this manner, and from the data thus obtained a curve may be drawn of equivalent temperatures at $\Delta\lambda=0$ versus distance along the wedge. A typical graph of this type is curve 27, Fig. 12.

Similar calibrations can be made for other values of $\Delta\lambda$. In Fig. 11, each peak of curve 24 corresponds to a value of $\Delta\lambda=0$, and the bottom of each trough corresponds to $\Delta\lambda=\pm0.42$ Å., as has been explained. Half-way between a peak and an adjacent trough, $\Delta\lambda=\pm0.21$ Å., and at one-fourth the distance from a peak to a trough, $\Delta\lambda=\pm0.10$ Å., substantially. By measuring off appropriate distances from the peaks, points can be located along curve 24 having any desired value of $\Delta\lambda$ from 0 to $\pm0.42$ Å.

For example, points corresponding to $\Delta\lambda=0.2$ may be located along curve 24. A line 28 may be drawn through these points. Where line 28 crosses line 25, the brightness of light of wavelength $\Delta\lambda=0.2$ transmitted through the wedge is equal to the brightness of a black body at a temperature of 2500° K. Equivalent temperatures for other points along the wedge may be computed by the same method that was used for $\Delta\lambda=0$, and a curve plotted. A typical curve for $\Delta\lambda=0.2$ is curve 29, Fig. 12. Other curves in Fig. 12, prepared in a similar manner, give the temperature versus distance along the wedge for $\Delta\lambda=0.04$, $\Delta\lambda=0.08$, and $\Delta\lambda=0.4$, respectively.

Brightness values versus distance along the wedge may be determined experimentally for each desired value of $\Delta\lambda$, as has been described. As an alternative procedure, part of the values may be calculated as follows, if the equation for $f_s$ versus $\Delta\lambda$ for the particular source is known. Equation 5 applies to flames. For sodium vapor lamps (8) $$f_s = e^{-\frac{\ln 2}{W_0^2}(\Delta\lambda)^2}$$

Brightness values are determined for one value of $\Delta\lambda$ in the manner previously explained, and the width of the interference fringes at half brightness is measured. The half brightness, half-width of a fringe in Å. is a value of $\Delta\lambda$ at which $f_{bb}$ is one-half as great as at $\Delta\lambda=0$. Since $f_{bb} \equiv 1-e^{-z/s}$, and since at $\Delta\lambda=0$, $f_s=1$; one can substitute the $f_s$ value corresponding to the half-point along the wedge by solving equation (9) $$\tfrac{1}{2}(1-e^{-z}) = 1-e^{-z/s}$$

and solve for $z$. If $W_0$ is also unknown, a similar equation is written for the quarter-brightness values, and the two equations are solved simultaneously for two unknowns, $z$ and $W_0$. With a known $z$, Equations 3 and 4 give $f_{bb}$ for any desired $\Delta\lambda$, from which it is possible to calculate brightness values corresponding to any $\Delta\lambda$ at any point along the wedge by solving equation (1) $$E = E_{bb} f_{bb}$$

and multiplying the value of E found by the transmission factor of the wedge at the point considered.

In using the method just described, if greatest accuracy is desired, a correction may be made in determining the true width of the spectral line from the observed width, to allow for the apparent broadening of the line due to limitations in the resolving power of the spectroscopic instrument used. A method of making this correction is described by Minkowski and Brück, in Zeit. f. Physik, vol. 95, p. 27 (1935), which may also be found in the book, "High Resolution Spectroscopy," by Tolansky, published by Methuen & Co., Ltd., London, 1945, pages 166-168. This method of correction is discussed hereinafter in connection with Fig. 20.

Figs. 11 and 12 provide sufficient calibration data for measuring temperatures within complex flames, as will now be described.

Referring now to Fig. 1, the apparatus is set up as shown and previously described, with lamp 7 turned on and with the complex flame, containing a small amount of sodium vapor, preferably about ¼ to ½ part per million, positioned at 10, so that an image of optical wedge 8 is formed in the region of the flame where temperature is to be measured, and overlapping images of the wedge and the flame are formed on photographic plate 17. These images comprise light from the wedge passing through the flame plus light emitted by the flame. The overlapping images are broken up into an interference pattern produced by interferometer 14, and have the appearance represented in Fig. 13. These overlapping images are photographed, using a camera plate, exposure time, and development process which are identical or equivalent to those used for the photograph represented by Fig. 10. Preferably, the two photographs are made upon different portions of the same photographic plates and developed simultaneously to insure identity of characteristics.

Referring now to Fig. 13, it will be noted that the overlapping images divide the interference pattern into several regions, each of which has a distinctive appearance. Region 30, which contains the pattern 30a and 30i and extends horizontally across the center of the pattern, is the brightest, and corresponds to the image of the optical wedge. This region is graduated in brightness from left to right due to the graduation in opacity of the optical wedge.

Corresponding to respective parts of the flame image, there are three regions extending vertically across the interference pattern. Region 31, which corresponds to the image of the hotter, inner portion of the flame, extends vertically across the center of the interference pattern. On each side of region 31 are regions 32 and 32' respectively, which correspond to the outer sheath of cooler gas in the flame. Region 31 is considerably brighter than regions 32 and 32', because of the temperature difference between the two parts of the flame.

Note that in region 31 the interference fringes appear dimpled: that is, each line appears as two bright lines, with a relatively dark region between the two. The reason for this is that light emitted by the hotter gas must pass through the outer sheath of cooler gas, and during such passage part of the light is absorbed. This absorption is greatest at the center wavelength, $\Delta\lambda=0$, as has been explained, and leaves the wings of the spectral line brighter than the center. The bright wings appear in the interference pattern as double or paired lines, with darker regions corresponding to the center of the spectral line between the two bright lines of each pair.

The dimpled appearance of the fringes is even more prominent in the patterns 30a to 30i of the region 30 of the interference pattern. Wherever the equivalent black-body temperature of light transmitted through the wedge exceeds the temperature of the flame, more light is absorbed in passing through the flame than is emitted, and this net absorption is greatest at wavelength $\Delta\lambda=0$.

The next step is to make a densitometer trace across the photograph of the overlapping images, preferably along a path corresponding to broken line 33, Fig. 13. A typical trace made in this manner is shown by curve 34, Fig. 14, having peaks 34a to 34i some of which are double peaks corresponding in the region 31 to the two bright lines with a relatively dark region between. Wedge index marks 20 may be indicated on the graph at their proper respective distances from the ends of the wedge. It is also helpful to indicate on the graph the portions which correspond to light paths which traverse only the cooler outer region of the flame, and the portion which corresponds to light paths which traverse both the hotter inner region and the cooler outer sheath. This is indicated on Fig. 14.

Next, curve 34, Fig. 14, is superimposed on curve 24, Fig. 11. A photographic print of the superimposed curves may be made. Fig. 15 represents such a print. Correct alignment is insured by aligning index marks 20 on one graph directly over the corresponding index marks on the other. The points where curves 24 and 34 cross are noted, and may be marked by small circles 35.

Referring now to those portions of Fig. 15 which correspond to light paths that pass through outer region only of the flame, a point is selected at which curves 24 and 34 cross. Curve 24 represents the brightness of light which enters the flame from the light source and optical wedge, and curve 34 represents the brightness of light which emerges from the flame. Each point where the two curves cross represents a brightness which the flame neither increases nor decreases: in other words, at each such point an equilibrium exists between the respective amounts of light emitted and absorbed by the flame. The condition for such an equilibrium is that the light have a brightness equal to that of a black body at the same temperature as the flame.

Since the light paths under consideration pass through but a single region of the flame, which region is substantially uniform in temperature, any value of $\Delta\lambda$ may be used. Suppose, for example, the point marked by circle 35' is selected. Note that this point is located 0.17 of the wedge length from its more opaque end, and corresponds to a value of $\Delta\lambda=0.08$, approximately.

Now refer to Fig. 12, and locate the point corresponding to a distance 0.17 of the wedge length from its more opaque end and a value $\Delta\lambda=0.08$. On the temperature scale at the left of Fig. 12, the point so located corresponds to a black body temperature of approximately 1890° K. This temperature, which we will call $T_o$, is the true temperature of the gas in the outer region of the flame.

The temperature of most simple, uniform flames can be measured by the method just described.

Referring now to that portion of Fig. 15 which corresponds to light paths that pass through both the inner and outer regions of the flame, a point is selected at which curves 24 and 34 cross at a value of Δλ, preferably between 0.1 Å., and 0.4Å., which is well out in the wings of the D-line spectrum. For example, the point marked by circle 35'' may be selected. It is noted that this point is located 0.6 of the wedge length from its more opaque end, and corresponds to a value of Δλ=0.2 Å., approximately.

Now refer to Fig. 12, and locate the point corresponding to a distance 0.6 of the wedge length from its more opaque end and a value Δλ=0.2. On the temperature scale at the left of Fig. 12, the point so located corresponds to a black body temperature of 2400° K. This temperature, which we will call $T^*$, is intermediate in value between the temperature of the gas in the inner region of the flame and the temperature of the gas in the outer region of the flame. However, because the measurement was made in the wings of the D-line spectrum, the temperature $T^*$ is closer to the true temperature of the inner region than is the value which would generally be obtained by a conventional sodium-line reversal measurement.

To calculate the true temperature of the inner region, it is first necessary to determine the relative distances through the different temperature regions along the light path corresponding to the point 35'' selected. If the cross-section of the flame is circular, all the data necessary for this determination is contained in the photograph represented by Fig. 13.

Referring to Fig. 13, it can be observed that the diameter of inner region 31 is 4/7 as large as the diameter of the entire flame. Therefore a cross section of the flame can be represented by two concentric circles, having diameters of 4 units and 7 units respectively. Fig. 16 shows two such circles. Circle 36 represents the outer boundary of the inner region of gas, while circle 37 represents the outer boundary of the outer region.

The point 35'' from which $T^*$ was determined is located 0.6 of the wedge length from its more opaque end. Again referring to Fig. 13, it can be observed that a point on the wedge image 0.6 of its length from the end corresponding to more opaque part of the wedge is 4/30 the diameter of the entire flame from the flame center. On Fig. 16, straight line 38 is drawn through the two circles 36 and 37 so that its nearest approach to the center of the circles is 4/30 the diameter of circle 37. Line 38 represents the path through the flame of light rays from which $T^*$ was determined. Such rays travel a distance $a$ through the outer region of the flame, a distance $b$ through the inner region, and a distance $c$ again through the outer region. Thus, the distance through the inner region is $b$, the total distance through the outer region is $a+c$, and the total distance through the entire flame is $a+b+c$. In the special case illustrated by Fig. 16, it can be determined by measurement that $b=a+c$.

If the flame does not have a circular cross section, other observations taken from the side of the flame may be necessary to determine the relative distances through the different flame regions along the selected optical path. However, since the different flame regions are usually clearly visible and sharply outlined, determination of relative distances through the different regions is seldom difficult. Also, it is not necessary that the thickness of the outer sheath be the same as both sides of the flame, if the total distance through each region along the selected optical path is determined.

It has already been determined that the temperature in the outer region of the flame, $T_o=1890°$ K. Also, that $T^*=2400°$ K. The black body brightness values which correspond to these temperatures are, respectively, $E_{bbo}=0.26$ units and $E^*=5.13$ units.

The black body brightness $E_{bbi}$ which corresponds to the true temperature of the inner region of the flame can now be determined from the equation $$(10) \quad E^* = \frac{bE_{bbi} + (a+c)E_{bbo}}{a+b+c}$$

Substituting the values previously determined ($E^*=5.13$, $E_{bbo}=0.26$, and $b=a+c$), and solving for $E_{bbi}$, it is found that $E_{bbi}=10$ units. Referring to Fig. 9, it is found that this brightness value corresponds to a temperature $T_i=2575°$ K., approximately. This is the true temperature of the hot gas in the inner region of the flame.

Equation 10 is an approximation which is sufficiently accurate for practical purposes provided the optical depth $zf_s$ of the flame does not exceed 0.5, and provided the sodium vapor density is substantially equal in both regions of the flame. Thus, in a flame containing very little sodium vapor, so that $zf_s \leq 0.5$ at Δλ=0, $T^*$ can be measured at any value of Δλ, even Δλ=0, and accurate results obtained. However, it is usually not practicable to use such low values of $z$: first, because in most flames it is difficult to reduce the natural sodium content to a sufficiently low value; and second, because a flame of such low optical depth provides very faint, hard-to-observe spectral lines. Therefore it is usually necessary to measure $T^*$ at a point in the wings of the spectrum where $f_s$ is sufficiently small that the product $zf_s \leq 0.5$. In most flames, a satisfactory optical depth is found at values of Δλ between 0.1 Å. and 0.4 Å., as previously specified.

When the optical depth of the flame is large, there is usually some overlapping of the interference fringes in the wings of the spectral line. This does not sensibly affect the values of T measured, but it is easier to read the result if $z$ is kept below 4.0.

Although the method has been described in connection with a complex flame having but two temperature regions, it will be appreciated that the principles involved can be extended to flames having any number of temperature regions, and that the complete distribution of temperatures across a section of such a flame can be determined from a single photograph of the flame. The temperature distribution along the length of the flame can also be determined from a single photograph, by using a wide optical wedge and taking a number of densitometer traces parallel to line 33, Fig. 13, at intervals along the length of the flame image. Each such densitometer trace provides data for determining the distribution of temperatures across a section of the flame at a varticular point along its length, and the temperatures determined from corresponding portions of each trace give the longitudinal distribution of temperatures; so that the complete temperature distribution over a fairly large flame area can be determined from a single photograph of the flame. This is a considerable advantage where the flames studied are of short duration or change rapidly in character. It will also be appreciated that densitometer traces could be made lengthwise along the flame image as well as across the image.

The combination of an optical wedge and a light source which produces resonance-type spectral line illumination provides a very wide range of equivalent black-body temperatures. Although in most cases the wedge is desirable or necessary, there are cases in which the light source alone provides a sufficient range of temperatures through the variations in brightness as a function of $\Delta\lambda$. In such cases, the optical wedge may be omitted from the apparatus shown in Fig. 1.

For example, a particular light source, without a wedge, may produce an interference pattern from which an interferometer trace similar to corve 39, Fig. 17, is obtained. Referring to Fig. 17, it may be observed that the interference fringes represented by curve 39 all have equal values of brightness at any given value of $\Delta\lambda$, but that the variations of brightness as a function of $\Delta\lambda$ provide a wide range of brightness values. For flames within a certain temperature range, the limits of which depend upon the range of brightness values provided by the source, light from the source which passes through the flame may produce an interference pattern from which a densitometer trace represented by curve 40 may be obtained, with relative values of curves 39 and 40 such that the two curves cross at points having usable $\Delta\lambda$ values. For example, points 41, Fig. 17, which represent equilibrium values for light passing through the entire flame, correspond to values of $\Delta\lambda=0.2$, approximately, and accordingly these points may be used to compute T* with good accuracy in the manner hereinbefore explained. Points 42 may be used to compute T₀. These computations are made as if the wedge transmission factor at all points on the traces were 1.000, which corresponds to the right-hand edge of Fig. 12.

It is often desirable to use a rotating sector wheel type of optical wedge. Referring to Fig. 18, disk 43 provides this type of wedge when it is rotated rapidly about its axis 44, by a motor or other suitable means. The radius of disk 43 varies, so that as it rotates light rays may pass the disk with an attenuation which is a function of their distance from the disk center. For example, rays which are distant from the center by an amount just slightly less than the greatest radius of disk 39 are permitted to pass during the greater part of each rotation cycle, and thus are but slightly attenuated. Rays nearer the center of the disk are intercepted by the disk for a greater portion of each cycle, and thus are more strongly attenuated. The resultant effect is that of an annular optical wedge, radially graduated in opacity with the most opaque portion nearest the center. A wedge of this type is useful where a large flame area is to be surveyed with a single observation. Of course, if it is not desired to use the entire annular wedge, a suitable portion may be selected by blocking off the remainder with a mask.

A great advantage of the rotating sector wheel type of wedge is that it provides minimum scattering of light by the wedge. With the photographic film type of wedge, in particular, the ratio of scattered light to transmitted light may be large enough to materially alter the transmission characteristics of the wedge under certain conditions. Another advantage is that the outside edge of the rotating sector wheel wedge may be completely transparent, which is generally not possible with wedges made of glass or photographic film.

When ever possible, it is preferable to compute temperatures in complex flames from brightness measurements made in the wings of the D-line spectrum, as has been described. Sometimes, however, the temperatures to be measured may be so high that it is either impossible or inconvenient to provide a light source which is sufficiently bright at wavelengths in the spectral line wings to match the equivalent brightness of a black body at the flame temperature. For example, suppose that when densitometer traces are made and superposed in the manner hereinbefore described, a result similar to that illustrated in Figure 19 is obtained.

Referring to Figure 19, curve 45 represents a densitometer trace taken across a photograph, similar to Fig. 10, of an interference pattern formed with no flame in the optical path. Curve 46 represents a densitometer trace across a photograph, similar to Fig. 13, taken with a complex flame in the optical path.

Points 47, where curves 45 and 46 cross, provide information from which T₀, the temperature in the outer region of the flame, can be calculated as hereinbefore described. But in that portion of the photograph corresponding to light rays which pass through both regions of the flame, the only points from which T* can be obtained are points 48, which correspond to a value of $\Delta\lambda=0.04$, approximately. At such small values of $\Delta\lambda$, the optical depth $zf_s$ usually exceeds 0.5, and therefore temperatures cannot be computed accurately from Equation 10. In this case a more complicated computation must be made, for which the equation

(11) $E_{abc}=E_{bbo}(1-t_c)+$
$E_{bbi}(1-t_b)t_c+E_{bbo}(1-t_a)t_bt_c$ may be used. The respective transmission factors $t_a$, $t_b$, and $t_c$ of the gas in regions traversed by portions $a$, $b$, and $c$ of optical path 38, Figure 16, must be computed, and a brightness value $E_{abc}$, hereinafter explained, must be measured.

There are several ways to determine the transmission factors. For the method which will now be described, the necessary data can be obtained from the photograph represented by Figure 13.

Referring now to Figure 13, it can be noted that portions of the photograph not included in the wedge image 30 comprise regions 32 and 32', which represent light emitted by gas in the outer region only of the flame, and region 31 which represents light emitted by gas in the outer region, and in addition, light emitted by gas in the inner region transmitted through the outer region of the flame. In region 30, which corresponds to the wedge image, there is, in addition, light from the light source transmitted through the optical wedge and the flame. The brightness of light at any point in any of these regions of the interference pattern can be determined by measuring the photographic density at that point, finding a point of equal density on curve 45, Figure 19, and noting the brightness of that point from the light source and wedge calibration data.

At any convenient value of $\Delta\lambda$, for example, $\Delta\lambda=0.04$, select a point in region 32 or 32', Figure 13, which represents light emitted by gas in the outer region only of the flame, and measure the photographic density of this point to determine a brightness value $E_d$. The point selected may, for example, correspond to an optical path through the flame represented by line 49, Figure 16, which travels a distance $d$ through the outer region of the flame. Now, determine the brightness value $E_w$ of a point on curve 45, Figure 19, and the brightness value $E_{wd}$ of a point on curve 46, both of which correspond to the same optical path 49 and the same value $\Delta\lambda = 0.04$. The transmission factor $t_d$ for the body of gas traversed by section $d$ of optical path 49 can then be determined from equation $$(12) \quad t_d = \frac{E_{wd} - E_d}{E_w}$$

Now select a point in region 31, Figure 13, outside wedge image 30, which has the same value of $\Delta\lambda = 0.04$ and which may correspond to an optical path through the flame represented by line 38, Fig. 16. Light rays traveling along this path travel a distance $a$ through the center region of the flame, a distance $b$ through the inner region, and an additional distance $c$ through the outer region. Measure the photographic density at the point so selected to determine the brightness value $E_{abc}$. Corresponding to the same optical path 38 and the same value of $\Delta\lambda = 0.04$, select a point on curve 45, Fig. 19, and from it determine the brightness value $E'_w$; and select a point on curve 46, and from it determine the brightness value $E_{wabc}$. The transmission factor $t_{abc}$ along path 38 is given by equation $$(13) \quad t_{abc} = \frac{E_{wabc} - E_{abc}}{E'_w}$$

The transmission factors $t_a$ and $t_c$ can now be computed from equation $$(14) \quad \frac{\log t_a}{a} = \frac{\log t_c}{c} = \frac{\log t_d}{d}$$

And the transmission factor $t_b$ can be computed from equation $$(15) \quad t_b = \frac{t_{abc}}{t_a t_c}$$

The black body brightness of the outer region is given by equation $$(16) \quad E_{bbo} = \frac{E_d}{1 - t_d}$$

There is now sufficient data to substitute in Equation 11 and solve for the brightness value $E_{bbi}$ from which the temperature $T_i$ of the inner region can be determined. If the gas in the inner region is much hotter than the gas in the outer region, the last term in the numerator of Equation 11 is negligible and may be omitted without appreciable error.

It is evident that the method just described does not require a match between curves 45 and 46 at any point. However, if a match point is present, such as point 48, it is usually preferable to select these points for the computations. For example, the value of $\Delta\lambda$ and the optical path through both regions of the flame corresponding to one of the points 48 could be chosen for the measurements and calculations which have been described. If this is done, then the brightness value of the match point, $E^* = E'_w = E_{wabc}$, and equation $$(17) \quad E^* = \frac{E_{bbo}(1 - t_c) + E_{bbi}(1 - t_b)t_c + E_{bbo}(1 - t_a)t_b t_c}{1 - t_a t_b t_c}$$

may be used in place of Equation 11.

Another method of determining optical depth, from which black body factors and transmission factors can be calculated, is to measure the half-brightness width in angstrom units of a spectral line. One-half of the line width so measured is a value of $\Delta\lambda$ which can be inserted in Equation 5 to compute the value of the shape factor $f_s$ at the half-brightness point. When this value of $f_s$ is substituted in equation $$(18) \quad \tfrac{1}{2}(1 - e^{-z}) = 1 - e^{-zf_s}$$

the solution for $z$ gives the optical depth at the central wavelength $\Delta\lambda = 0$. From this the optical depth $zf_s$ at any desired value of $\Delta\lambda$ can be calculated.

When using this method of determining optical depth, the width of a spectral line can be determined from a measurement of width between half-intensity points on each side of an interference fringe. But in making this determination, a correction is usually necessary to allow for limitations in resolving power of the spectroscopic element used. For example, a line of perfectly monochromatic light would appear to have some width when observed through any spectroscopic instrument of finite resolving power. This width, which would be observed even with a line which actually was infinitely narrow, we will call the "instrument width," and represent by the letter $A$. We will let $W$ represent the observed width, and $w$ represent the true width of the spectral line. The true width can then be determined from the chart shown in Figure 20. For example, suppose that the spectroscopic element used has a resolving power such that the instrument width $A = 0.06$ Å and the observed width of an interference fringe is 0.2 Å, then $$\frac{A}{W} = 0.3$$

Referring to Figure 20, it is apparent that the corresponding ratio $$\frac{w}{W} = 0.9$$

approximately. Therefore, the true width of the spectral line is 0.9 of 0.2 Å, or 0.18 Å.

Another method using principles of this invention to measure flame temperatures is carried out with the apparatus illustrated in Figure 21. When using this method it is not necessary to provide an external source to direct light through the flame in which temperature is to be measured. The method may be used with either a simple or a complex flame. The more difficult case, where the flame is complex, will be described, but it will be evident that the same principles can be applied to measure the temperature of a simple flame.

Refer now to Figure 21, a flame is represented at 49 which has an inner zone bounded by circle 49' and an outer zone bounded by circle 49''. Light rays emitted by the flame pass through collimating lens 50, from which all rays from any given point in the flame emerge substantially parallel. The parallel rays pass through a spectroscope instrument of high resolving power, such as the Fabry-Perot interferometer 51. After passing through the interferometer, the rays are focused upon the plate 52 of a camera 53 by the camera lens 54, so that an image of the flame is outlined in an interference pattern on the camera plate. A filter 55 is placed at some convenient point in the optical path to reduce unwanted background illumination by attenuating light which differs greatly in wavelength from the spectral lines to be used—for example, the D lines. Directly behind the flame a mirror 56 is placed so that half the flame image on the camera plate is intensified by light reflected from the mirror.

Refer now to Fig. 22, which represents the interference pattern formed on camera plate 52, Fig. 21. Note that an image of the flame is outlined in the pattern. The central portion of the pattern, which corresponds to the image of the inner portion of the flame, is brighter than the portions at the right and left of the pattern, which correspond to the image of the outer zone. Therefore, in this case the inner zone of the flame is hotter than the outer zone, since it produces a brighter image. Also note that the left side of the interference pattern is brighter than the right side, since the left side of the pattern is intensified by light reflected from the mirror behind the flame, whereas the right side receives light from the unmirrored portion of the flame only.

Two densitometer traces are made across this potograph along paths corresponding to lines 57 and 58, Fig. 22, the line 57 having the patterns 57a to 57j and the line 58 having the patterns 58a to 58j. These densitometer traces are represented by lines 59 and 60, respectively, in Fig. 23.

Now refer to Fig. 23. Curve 59 represents a densitometer trace taken across the mirrored portion of the flame image photograph, and curve 60 represents a similar trace taken across the unmirrored portion. On curve 59, a value of $\Delta\lambda$ is selected which preferably is in the wings of the D-line spectrum, as hereinbefore discussed. For example, a value of $\Delta\lambda=0.2$ may be selected. Line 61 is drawn through the points on curve 59 which have this value of $\Delta\lambda=0.2$. Line 62 is drawn through the points on curve 60 which have the same value of $\Delta\lambda=0.2$.

If a photograph, similar to Fig. 10, of a calibrated light source and wedge is taken, using the same or an equivalent photographic plate, exposure time, and developing process as was used for the photograph represented by Fig. 22, the brightness represented by each point on the curves of Fig. 23 can be determined. This is done by making a densitometer trace similar to Fig. 11 across the photograph of the calibrated source and wedge image, finding a point on this trace which has the same photographic density as the point under consideration on Fig. 23, and determining the brightness represented by this point from the wedge and light source calibration data. In this way brightness values for the points through which lines 61 and 62, Fig. 23, were drawn can be determined. We will represent these two brightness values by the symbols $E_m$ and $E_u$, where $E_m$ is the brightness of the mirrored portion of the flame image interference pattern, and $E_u$ is the brightness of the unmirrored portion.

At the selected value of $\Delta\lambda$, the optical depth through the entire flame $z_{abc}f_s$ can be determined from the ratio of $E_m$ to $E_u$. Curve 63, Fig. 24, gives this relation. For example, suppose it is found that $E_m$ equals 60 arbitrary brightness units, and $E_u$ equals 35 units. Then $$\frac{E_m}{E_u}=1.7$$

Referring to Fig. 24, it is apparent that this ratio corresponds to an optical depth $zf_s$ of about 0.2.

To determine the temperature of the flame, the equivalent black body brightness is needed. In the case of a simple flame, this can be determined simply by dividing the observed brightness of the unmirrored portion $E_u$ by the black body factor $(1-e^{-z/s})$. In the case of a complex flame, however, the value thus obtained is $E^*$.

(19) $$E^*=\frac{E_u}{1-e^{-z_{abc}f_s}}$$

Since a value of $\Delta\lambda$ was chosen which is in the wings of the D-line spectrum, this value of $E^*$ can be used with Equation 10 to determine the black body brightness of the inner zone $E_{bbi}$. The black body brightness of the outer zone $E_{bbo}$, can be determined in any of the ways previously discussed.

If there is a longitudinal temperature gradient in the flame, successive cycles of curves 59 and 60, Fig. 23, will not be of equal height, and lines 61 and 62 will not be horizontal. However, the values represented by lines 61 and 62 at any point selected can be used to compute the temperature of the corresponding point of the flame in the manner which has been described, and by computing the temperatures at a number of such points, the temperature distribution along a large length of the flame can be determined from a single photograph.

Calibration data can be obtained from a standard flame without using a light source and optical wedge, in the following manner: Refer now to Fig. 25. A standard flame is represented at 64 which has a uniform known temperature, but may have an unknown optical depth. Light rays emitted by the flame are collimated by lens 65, pass through filter 66 and interferometer 67, and are imaged on the plate of camera 68. A mirror 69 is positioned behind the flame so that it intensifies one-half of the flame image on the camera plate. Immediately in front of the camera plate is an optical wedge 70, which produces a graduated intensity of both the mirrored and the unmirrored portions of the flame image. Preferably wedge 70 is of the rotating sector wheel type to minimize scattering of light.

Refer now to Fig. 26, which represents the pattern formed on the plate of camera 68, Fig. 25. The left, or brighter, side of the pattern represents the mirrored portion of the flame and contains the patterns 71a to 71j, while the right side represents the unmirrored portion containing the patterns 72a to 72j. Also, there is a graduation in brightness from bottom to top due to the graduated opacity of the optical wedge. Densitometer traces are taken along paths corresponding to lines 71 and 72.

Refer now to Figure 27, in which curves 73 and 74 represent densitometer traces taken along lines 71 and 72, Fig. 26, respectively. Line 75 is drawn through all the points on curve 73 having a selected value of $\Delta\lambda$—for example, $\Delta\lambda=0.2$. Line 76 is drawn through all points on curve 74 at the same selected value of $\Delta\lambda$.

To determine the optical depth of the standard flame at the selected value of $\Delta\lambda$, choose any two points respectively located on line 75 and 76 at equal photographic density values. For example, points 77 and 78 may be chosen at a photographic density 0.3. From a curve of wedge transmission factors similar to Fig. 8, it may be determined that the transmission factor at point 77 is 0.09, for example, and that the transmission factor at point 78 is 0.16. Then the ratio $$\frac{E_m}{E_u}=1.75$$

approximately, and from curve 24 the optical depth of the flame equals 0.2 at the $\Delta\lambda$ value selected.

Since the temperature, and hence the equivalent black body brightness, of the flame is known, and since the black body factor at the selected value of $\Delta\lambda$ can be computed from the optical depth in the manner hereinbefore described, it is now a simple matter to determine the true brightness of the flame at the selected value of $\Delta\lambda$ from Equation 1. The brightness at any point along the wedge is then determined by multiplying the flame brightness by the transmission factor of the wedge at that point. Thus the brightness corresponding to each value of photographic density on Fig. 27 is determined.

If the photographs represented by Figs. 22 and 26, respectively, are prepared using the same or equivalent photographic plates, exposure times, and development processes, each value of photographic density in Fig. 23 represents the same brightness as the corresponding value of photographic density in Fig. 27. Thus Fig. 27 can be used to calibrate the curves of Fig. 23.

Where the temperature of the standard flame is substantially lower than the temperatures to be measured, a sufficient range of brightness values may not be obtained when identical exposure times are used for the two photographs in the method just described. This difficulty can often be overcome by giving the photograph of the standard flame a longer exposure. For example, the photograph of the standard flame may be made with an exposure time twice that used in the photograph of the unknown flame. This, in effect, multiplies the brightness of the standard flame by two. However, care must be exercised to stay within that range of exposures for which the particular film used obeys the photographic reciprocity law. Exposure ratios much greater than 2 to 1 are usually to be avoided because of the possibility of reciprocity failure of the film. In a similar manner, unequal exposure times may be used with other pairs of photographs herein described. Or, standard light filters may be used to reduce the brightness of the brighter flame, so that equal exposure times can be used.

So far, it has been assumed that the mirrors used give perfect reflection. In actual practice, the mirrors will not reflect all of the light incident upon them, and different mirrors will have somewhat different coefficients of reflection. Therefore, if greatest accuracy is to be achieved, the measured brightness of mirrored portions of the flame images should be increased slightly to compensate for the imperfect reflection of the mirrors. For example, the mirrors to be used may be experimentally calibrated to determine the proper correction factor to be applied under various circumstances.

Having described the principles of this invention, and the best mode in which we have contemplated applying those principles, we wish it to be understood that the examples described are illustrative only, and that other means can be employed without departing from the true scope of the invention.

What we claim as new and desire to secure by Letters Patent of the United States is:

1. Apparatus for obtaining radiation measurements from which the temperatures of two zones in a flame may be determined; said flame having an inner zone at a first temperature and an outer zone at a second temperature surrounding said inner zone, and said flame containing a chemical element producing resonance spectral line radiations; said apparatus comprising, in combination: means for directing radiations of the same spectral composition as said resonance spectral line through at least a portion of said flame along paths which pass through said outer zone only and paths which pass through both said inner and outer zones; means for receiving the radiations of said resonance spectral line both passed through said portion of said flame and generated in said flame, and for spectrally spreading the wavelengths of radiation included in said resonance spectral line into intensity-wavelength patterns, the observable intensity of the center wavelength of said resonance spectral line radiations from said inner zone being modified by absorption in passing through said outer zone, but wavelengths substantially displaced from the center wavelength of said resonance spectral line being relatively unaffected in intensity in passing through said outer zone; and means for recording said intensity-wavelength patterns of radiation through and from both said inner and outer zones; whereby densitometer traces of said patterns may be compared with a calibrating densitometer trace to compute the temperature of said outer zone, and may be compared with said calibrating densitometer trace at wavelengths displaced from the center wavelength of the resonance spectral curves formed by radiation passing through and from both said zones, to afford an accurate computation of the temperature of said inner zone.

2. Apparatus for obtaining radiation measurements from which the temperature of a hot inner zone of a flame may be determined, said flame having a cooler outer zone surrounding said inner zone, and said flame containing in both zones thereof small amounts of a chemical element producing a resonance spectral line of radiation which varies in brightness with temperature, said apparatus comprising: means for directing radiations of the same spectral composition as said resonance spectral line through at least a portion of said flame along paths which pass through said outer zone only and paths which pass through both said inner and outer zones; filter means receiving the radiations of said resonance spectral line both passed through said portion of said flame and generated in said flame; means for receiving radiations passed by said filter means and for spectrally spreading the wavelengths of radiation included in said resonance spectral line into intensity-wavelength patterns, the observable intensity of the center wavelength of said resonance spectral line radiations from said inner zone being decreased by absorption in passing through said outer zone, but wavelengths substantially displaced from the center wavelength of said resonance spectral line being relatively unaffected in intensity in passing through said outer zone; and means for recording said intensity-wavelength patterns of radiation through and from both said inner and outer zones; whereby a densitometer trace of said patterns may be compared with a calibrating densitometer trace at wavelengths displaced from the center wavelength of the resonance spectral curves formed by radiation passing through and from both said zones, to afford an accurate computation of the temperature of said inner zone.

3. Apparatus for obtaining radiation measurements from which the temperature of a hot inner zone of a flame may be determined, said flame having a cooler outer zone surrounding said inner zone, and said flame containing in both zones thereof small amounts of a chemical element producing a resonance spectral line of radiation which varies in brightness with temperature, said apparatus comprising: a calibrated source of substantially monochromatic light producing radiations of the same spectral composition as said resonance spectral line; means directing said light transversely through said flame; means interposed between said source and said flame for graduating the brightness of said light passed through said flame in a predetermined manner along a direction transverse to the direction of light travel; means receiving the radiation of said resonance spectral line both passed through said flame and generated in said flame and spectrally spreading the wavelengths of radiation included in said resonance spectral line into intensity-wavelength patterns, the effective intensity of the center wavelengths of said resonance spectral line from said inner zone being decreased by absorption of radiations in passing through said outer zone, but the wavelengths displaced from the center wavelength of said resonance spectral line from said inner zone being relatively unaffected in intensity in passing through said outer zone; and means for recording said intensity-wavelength patterns of radiation through and from both said inner and outer zones; whereby a densitometer trace of said patterns may be compared with a calibrating densitometer trace, obtained in the absence of said flame, at wavelengths displaced from the center wavelength of the resonance spectral curves formed by radiation passing through and from both said zones, to afford an accurate computation of the temperature of said inner zone.

4. Apparatus for obtaining radiation measurements from which the temperatures of two zones in a flame may be determined; said flame comprising an inner zone at a first temperature and an outer zone at a second temperature concentrically surrounding said inner zone, and said flame containing a chemical element producing resonance spectral line radiations, said apparatus comprising, in combination: an intensity-calibrated source of substantially monochromatic light radiation including radiations of the same spectral composition as said resonance spectral line; an optical wedge having a predetermined transmission factor variation receiving radiation from said source and transmitting space-varied intensities of said radiation; means directing radiation transmitted by said wedge transversely through said flame; collimating means receiving said radiation directed through said flame and radiation directly from said flame; filtering means receiving collimated radiation passed by said collimating means and attenuating all radiation wavelengths except those in the region of said resonance spectral line; high-resolution interferometer means receiving radiations passed by said filtering means and spectrally spreading the wavelengths of radiation included in said resonance spectral line into a brightness-wavelength interference pattern; and means for recording said interference pattern; whereby a densitometer trace of said recorded interference pattern may be made and compared with a standard densitometer trace obtained from said source and wedge to mathematically compute the temperatures of said inner and outer zones, said traces being comparable at wavelengths substantially displaced from the center wavelength of the resonance curves on said traces in the region where said source radiations pass through both said zones of said flame to obviate errors produced by the effect of said outer flame zone on the observable intensity of radiations in the center wavelength region of said spectral resonance line.

5. Apparatus for obtaining radiation measurements from which the temperature of a hot inner zone, in a flame having a cooler outer zone surrounding said inner zone and containing small amounts of sodium radiating sodium light of an intensity dependent upon temperature and wavelength, may be determined, comprising, in combination: a calibrated source of sodium light radiations; an optical wedge of predetermined transmission factor variation; means directing radiations from said source through said wedge and transversely through said flame; a filter positioned to receive said radiation directed through said flame and radiation generated by said flame and attenuating substantially all radiation wavelengths except sodium resonance spectral D line radiation wavelengths; a collimating lens receiving said sodium D line radiations passed by said filter; a high-resolution interferometer receiving collimated sodium D line radiations from said lens and spectrally spreading the relatively narrow band of said sodium D line sufficiently to enable a differentiation of the intensity of radiation wavelengths displaced on either side of the center wavelength of said sodium D line; and a camera to photographically record the interference pattern of radiations passed by said interferometer; whereby a densitometer trace of said recorded interference pattern may be made and compared with a calibrating densitometer trace obtained from said source and wedge alone, and the temperature of said inner zone may be mathematically computed from observed match points of said two traces at wavelengths substantially displaced from the center wavelength of sodium D line resonance curves appearing thereon, the absorption of sodium D line wavelengths displaced from the center wavelength generated in said inner zone by said outer zone being much less than the absorption of sodium D line center wavelengths so that the final temperature determination is accurate.

6. Apparatus for obtaining radiation measurements from which the temperature of a hot inner zone of a flame may be determined, said flame having a cooler outer zone surrounding said inner zone, and said flame containing in both zones thereof small amounts of a chemical element producing a resonance spectral line of radiation which varies in brightness with temperature, said apparatus comprising: a light reflecting element positioned on one side of said flame to reflect radiations generated in said flame, and including radiations of said resonance spectral line, back through a portion of said flame, said reflection being along paths including a path passing through both said inner and outer zones; means positioned on the opposite side of said flame for receiving the radiations of said resonance spectral line both reflected back through said portion of said flame and generated in said flame, and for spectrally spreading the wavelengths of radiation included in said resonance spectral line into intensity-wavelength patterns, the observable intensity of the center wavelength of said resonance spectral line radiations from said inner zone being decreased by absorption in passing through said outer zone, but the wavelengths substantially displaced from the center wavelength of said resonance spectral line being relatively unaffected in intensity in passing through said outer zone; and means for recording said intensity-wavelength patterns of radiation reflected through and from said inner and outer zones; whereby a densitometer trace of said patterns may be compared with a calibrating densitometer trace, obtained in the absence of said flame, at wavelengths substantially displaced from the center wavelength of the resonance spectral curves formed by radiation reflected through and from both said zones, to afford an accurate computation of the temperature of said inner zone which is substantially free of absorption errors.

7. Apparatus for obtaining radiation measurements from which the temperature of a hot inner zone of a flame may be determined, said flame having a cooler outer zone surrounding said inner zone, and said flame containing small amounts of sodium vapor in both zones thereof, said sodium vapor emitting radiations including wavelengths forming a sodium resonance spectral D line, said apparatus comprising: a mirror positioned on one side of said flame to direct reflected radiations, including radiations of said D line, from a portion of said flame back through said portion of said flame, said reflected radiations being directed back along paths including a path passing through both said inner and outer zones; collimating means positioned on the opposite side of said flame to receive both said reflected radiations directed through a portion of said flame and radiations generated by said flame; a filter positioned to receive collimated radiation from said collimating means and for attenuating all radiation wavelengths except those in the spectral region of said sodium resonance spectral D line radiation wavelengths; a high-resolution interferometer receiving said D line radiations passed by said filter and spectrally spreading the relatively narrow band of said sodium D line into a brightness-wavelength pattern to enable a differentiation of intensity of radiation wavelengths displaced on either side of the center wavelength of said sodium D line; and a camera receiving said brightness-wavelength pattern from said interferometer for photographically recording said pattern; whereby a densitometer trace of said recorded pattern may be made and compared with a calibrating densitometer trace at points corresponding to wavelengths of said D line substantially displaced from the center wavelength of said D line; the comparison at such points enabling accurate computation of the temperature of said inner zone due to negligible absorption of wavelengths displaced from the center frequency of sodium D line radiations generated in said inner zone during passage through said outer zone, and obviating the effect of absorption which greatly reduces the intensity of the center wavelengths of said D line generated in said inner zone and which occurs during passage through said outer zone.

HERBERT M. STRONG.
FRANCIS P. BUNDY.

REFERENCES CITED

The following references are of record in the file of this patent:

UNITED STATES PATENTS

| Number | Name | Date |
|---|---|---|
| 1,455,795 | Logan | May 22, 1923 |
| 1,901,632 | Chamberlain | Mar. 14, 1933 |
| 1,979,964 | Duffendack et al. | Nov. 6, 1934 |
| 2,166,824 | Runaldue | July 18, 1939 |
| 2,425,758 | Saunders | Aug. 19, 1947 |

FOREIGN PATENTS

| Number | Country | Date |
|---|---|---|
| 669,880 | France | Aug. 10, 1929 |
| 495,906 | Germany | Apr. 12, 1930 |
| 355,911 | Great Britain | Sept. 3, 1931 |
| 528,701 | Great Britain | Nov. 5, 1940 |

OTHER REFERENCES

Proceedings of the Royal Society of London—article by Nerton, Series A, vol. 113, November 1926—January 1927, pages 697 to 703 incl.—Photostatic copy in 88—14 PT.

Metal Progress: "New Pyrometer for Hot Gases," November 1934—pages 30-33; publ. American Society for Metals, Cleveland, Ohio—Photostatic copy in 88—22.5.

Journal of the Optical Society of America—article by Meissner, vol. 31, 1941—pages 405, 412 to 419 inclusive. Photostatic copy in 88—14 (S).

Journal of The Optical Society of America—article by Meissner, vol. 32, 1942, pages 185, 195 to 197 inclusive—Photostatic copy in 88—14 (S).

Instruments; article on Absorption-emission Pyrometer—Vol. 20, 1947—pages 978 to 980 inclusive—Publ. Instruments Publ. Co.—921 Ridge Ave., Pittsburgh, Penna.

Harrison et al.: text Practical Spectroscopy—1948, pages 547, 548, 553 and 566, publ. by Prentice-Hall Inc.—copy in Division 7.